W. L. PATTERSON.
PROJECTION APPARATUS.
APPLICATION FILED AUG. 30, 1912.
1,202,753.
Patented Oct. 24, 1916.
2 SHEETS—SHEET 1.
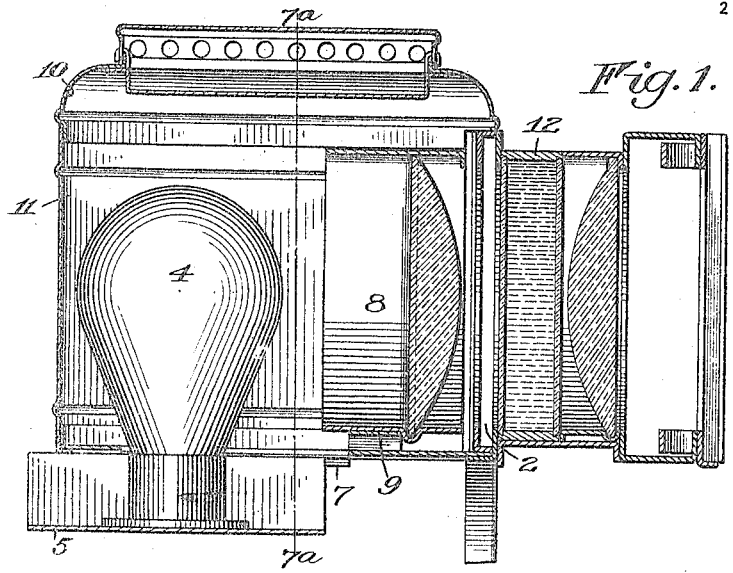
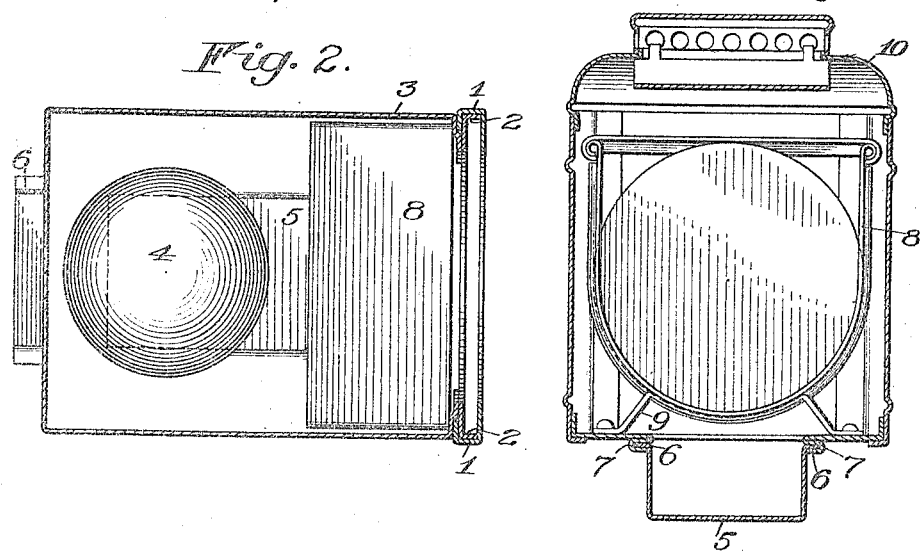
Witnesses
Walter B. Payne
H. E. Stonebraker
Inventor
William L. Patterson
By Church—Rich
Attorney

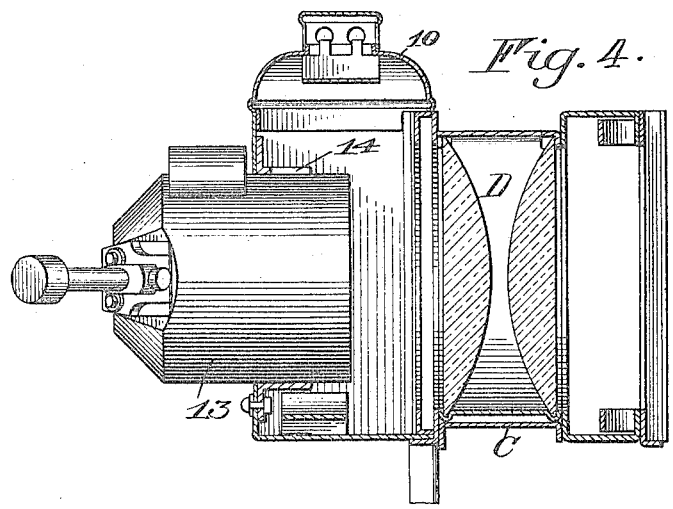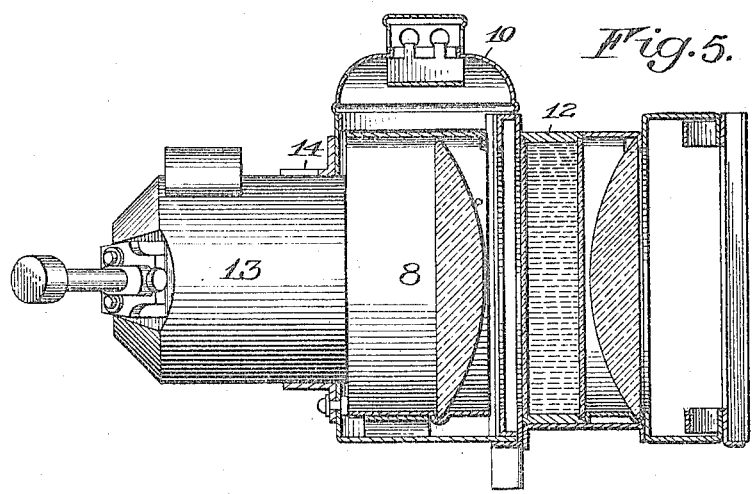

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

1,202,753.

Specification of Letters Patent.

Patented Oct. 24, 1916.

Application filed August 30, 1912. Serial No. 717,847.

*To all whom it may concern:*

Be it known that I, WILLIAM L. PATTERSON, of Rochester, in the county of Monroe and State of New York, have invented certain new and useful Improvements in Projection Apparatus; and I do hereby declare the following to be a full, clear, and exact description of the same, reference being had to the accompanying drawings, forming a part of this specification, and to the reference numerals marked thereon.

My present invention relates to improvements in projection apparatus, and it has for one of its objects to provide a novel arrangement which permits different types of lamps to be interchangeably employed in the same apparatus.

A further object of the invention consists in the provision of means for supporting a condensing lens in the lamp house, so as to enable a cooling chamber to be used between the lenses, if desired.

To these and other ends the invention consists in certain improvements and combinations of parts, all as will be hereinafter more fully described, the novel features being pointed out in the claims at the end of the specification.

In the drawings, Figure 1 is a vertical sectional view showing the application of my invention, with a cooling chamber between the lenses, one of the condensing lenses being arranged within the lamp house; Fig. 2 is a transverse sectional view of the lamp shown in Fig. 1; Fig. 3 is a sectional view on the line 7ª—7ª of Fig. 1; Fig. 4 is a vertical sectional view showing another type of lamp house for use with an arc light; and Fig. 5 is a similar view, the parts being arranged to receive one of the condensing lenses within the lamp house.

Similar reference numerals throughout the several figures indicate the same parts.

In the present embodiment of the invention there is employed a frame generally such as employed in this type of apparatus, on which is mounted a support C adapted to receive a lens holder of any suitable form.

The frame is arranged to receive interchangeable lamp houses, so as to adapt the apparatus for use either with incandescent or arc lamps, and to this end it includes, vertically disposed guideways 1, which receive the slides 2, the latter being attached in any suitable manner to the lamp house 3.

4 designates a lamp, the latter being mounted on the support 5 which carries flanges 6 arranged to engage track 7 formed on the bottom of the lamp house, whereby the lamp may be moved back and forth within the lamp house for a purpose that will presently appear. By simply lifting the lamp house vertically, it can be removed and another substituted readily, to enable an incandescent and arc light to be interchangeably employed.

In using a projection apparatus of this character in connection with films, it is desirable to employ a cooling chamber to prevent curling of the film under the influence of the heat. Under such conditions, the space between the lamp house and plate is sufficient to accommodate a cooling chamber, and it is desirable to arrange one of the lenses in the lamp house. To this end, the lamp house is preferably provided with a lens holder 8 which may be of any suitable form, and is preferably constructed in accordance with the previously mentioned holder D, and as shown in Fig. 3. 9 is a support for the lens holder which is arranged in the bottom of the lamp house. In order to enable lens holder and lens to be readily positioned in the lamp house, I provide the latter with a detachable top or cover 10 which is slidably engaged with the body portion 11 of the lamp house. When the lens holder 8 is arranged within the lamp house, the lamp support 5 is moved rearwardly to the position shown in Fig. 1, so that it occupies the proper position relatively to the system of condensing lenses.

12 designates the cooling chamber which is arranged on the support C, so as to be in position between the two lenses of the system.

In Figs. 4 and 5 I have shown a lamp house arranged to receive an arc light, the body portion of which is designated generally at 13. 11 is a support for the arc light body which is removably attached to the lamp house and may be secured either inside or outside, as shown in Figs. 4 and 5, respectively, so that the light may be moved to maintain its proper relation to the condensing lens when the cooling chamber is employed between the lenses. That is to say, when one of the lenses is arranged within the lamp house, as shown in Fig. 5, the support 14 is secured to the outside, and the lamp body is adjusted to substantially the position shown in the same figure.

I claim as my invention:

1. In a projection apparatus, the combination with a frame having a lamp house thereon, a lens disposed on the frame in advance of the lamp house, a cooling chamber arranged between said lens and the lamp house, a support within the lamp house at the forward part thereof, and a lens holder removably arranged on said support.

2. In a projection apparatus, the combination with a frame and a lamp house mounted thereon, of a lens disposed on the frame in advance of the lamp house, a cooling chamber arranged between said lens and the lamp house, and a lens holder for a second lens removably positioned within the lamp house.

3. In a projection apparatus, the combination with a frame having a support for a lens, a cooling chamber, of a pair of vertically disposed guideways arranged at the rear edge of said support, a removable lamp house provided with vertical slides attached thereto and having engagement with the aforesaid guideways at the rear edge of the support, a second support at the forward portion of the lamp house, and a lens holder removably arranged on the last mentioned support immediately in the rear of said slides.

WILLIAM L. PATTERSON

Witnesses:
WILLIAM G. WOODWORTH,
DANIEL M. SMITH.